US012179934B2

(12) United States Patent
Wong et al.

(10) Patent No.: US 12,179,934 B2
(45) Date of Patent: Dec. 31, 2024

(54) METHOD AND APPARATUS FOR AUXILIARY POWER UNIT INSTALLATION

(71) Applicant: The Boeing Company, Chicago, IL (US)

(72) Inventors: Alan J. Wong, Issaquah, WA (US); Curtis John Call, Federal Way, WA (US); Theodore Carl Arnold, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 536 days.

(21) Appl. No.: 16/404,559

(22) Filed: May 6, 2019

(65) Prior Publication Data

US 2020/0354075 A1    Nov. 12, 2020

(51) Int. Cl.
*B64D 41/00* (2006.01)
*B64C 1/16* (2006.01)
*B64D 27/40* (2024.01)

(52) U.S. Cl.
CPC ............... *B64D 41/00* (2013.01); *B64C 1/16* (2013.01); *B64D 27/40* (2024.01); *B64D 27/402* (2024.01); *B64D 2041/002* (2013.01)

(58) Field of Classification Search
CPC ...... B64D 41/00; B64D 2041/002; B64C 1/16
See application file for complete search history.

(56) References Cited

U.S. PATENT DOCUMENTS

| | | | | |
|---|---|---|---|---|
| 5,655,359 | A * | 8/1997 | Campbell | F02C 7/14 60/772 |
| 6,092,360 | A * | 7/2000 | Hoag | F02C 7/32 60/783 |
| 7,014,144 | B2 * | 3/2006 | Hein | F02C 7/045 244/53 B |
| 9,205,926 | B2 * | 12/2015 | Ouplomb | B64D 41/00 |
| 9,540,114 | B2 * | 1/2017 | Nager | B64D 41/00 |
| 10,112,726 | B2 * | 10/2018 | Wilson | G01K 11/3206 |
| 10,618,661 | B2 * | 4/2020 | Gibbons | B64D 13/06 |
| 2016/0152344 | A1 * | 6/2016 | Palomares Mora | B64D 41/00 244/58 |
| 2016/0311555 | A1 * | 10/2016 | Cazenave | B64D 41/00 |
| 2018/0327108 | A1 * | 11/2018 | Rosado | B64D 41/00 |

\* cited by examiner

*Primary Examiner* — Peter M Poon
*Assistant Examiner* — Marisa V Conlon
(74) *Attorney, Agent, or Firm* — Joseph M. Butscher; The Small Patent Law Group LLC

(57) ABSTRACT

An aircraft is disclosed, including a fuselage having a compartment configured to house refueling apparatus. An auxiliary power unit is mounted in the compartment.

20 Claims, 5 Drawing Sheets

METHOD AND APPARATUS FOR AUXILIARY POWER UNIT INSTALLATION

FIELD

This disclosure relates to systems and methods for aircraft auxiliary power unit installation. More specifically, the disclosed examples relate to retrofitting tanker aircraft with an auxiliary power unit.

INTRODUCTION

Aircraft are often retrofitted at some point in their operational lifetime, for instance to accommodate changing fleet requirements, incorporate newly introduced technologies, or comply with new regulations. Aircraft designs may also be modified or adapted to create new craft without extensive additional design work.

Because modified aircraft often require more electrical power than what the aircraft initially required, additional auxiliary power units (APUs) can play an important role in such retrofits or redesigns. However, the combustion engines used in APUs generate heat and exhaust that requires ventilation and render the units inappropriate for housing in pressurized cabin environments. Modifications to the airframe for a dedicated pressure box to safely house the APU internally can impose a weight and cost penalty on the original aircraft design. On the other hand, mounting an APU at or on the exterior of the plane can significantly increase aerodynamic drag and the complexity of design and/or testing needed. For example, resulting changes to the aerodynamic properties of the aircraft must be accounted for.

SUMMARY

The present disclosure provides systems, apparatuses, and methods relating to installation of an auxiliary power unit (APU) in the fuselage of an aircraft. In some examples, an aircraft may include a fuselage having a compartment configured to house refueling apparatus. An APU may be mounted in the compartment. In some examples, a method of installing an APU in an aircraft may include retrofitting a refueling hose drum unit compartment in a fuselage to house the APU. In some examples, an aircraft may include a fuselage having an internal compartment that maintains substantially the same pressure as the pressure external to the aircraft. An APU may be mounted in the compartment.

Features, functions, and advantages may be achieved independently in various examples of the present disclosure, or may be combined in yet other examples, further details of which can be seen with reference to the following description and drawings.

DETAILED DESCRIPTION

Figure 1:
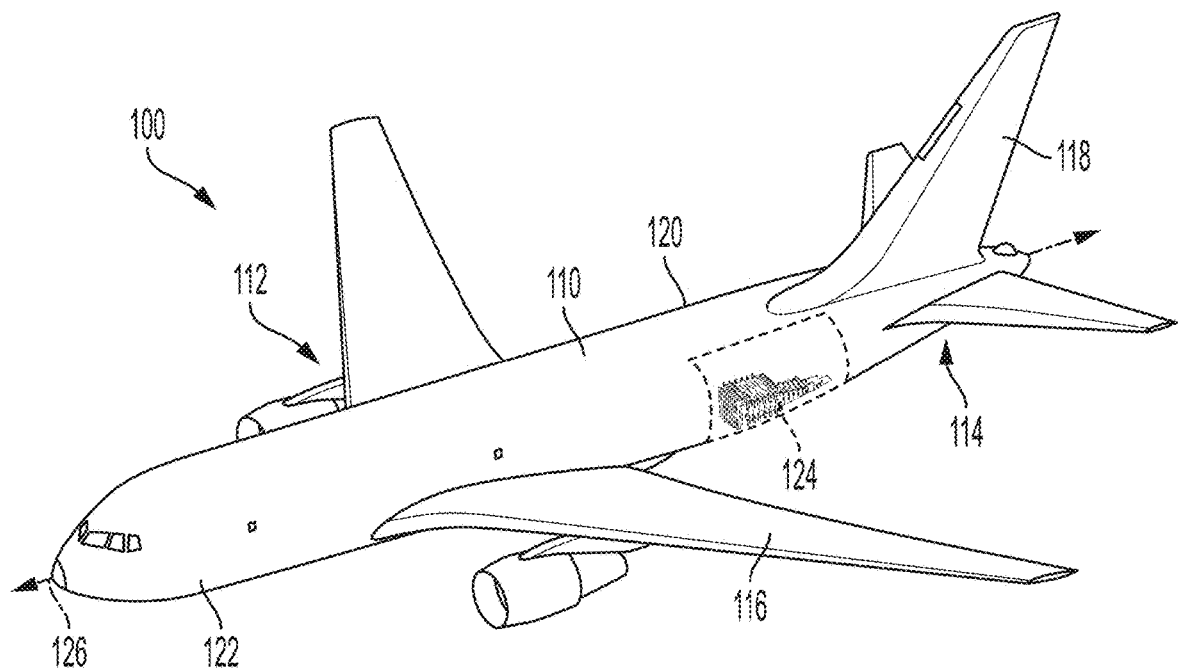
FIG. 1 is an isometric view of an illustrative tanker aircraft in accordance with aspects of the present disclosure.

Various aspects and examples of an aircraft having an auxiliary power unit mounted in the fuselage, as well as related installation methods, are described below and illustrated in the associated drawings. Unless otherwise specified, an aircraft in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a method of installing an Auxiliary Power Unit (APU) in accordance with the present teachings may include providing an aircraft with a fuselage having an internal compartment, where the internal compartment is in fluid communication with the exterior of the fuselage and the aircraft. The compartment may thereby remain at the same pressure as the exterior of the aircraft. The compartment may be sealed off from the remainder of the fuselage and may be configured to withstand a pressure differential between a first pressure level interior to the fuselage and a second pressure level exterior to the fuselage. The interior of the compartment may match the second pressure level.

In some examples, the aircraft may be a tanker aircraft and the internal compartment may be a pressure compartment or pressure box housing a refueling apparatus such as a Hose Drum Unit (HDU) of a hose and drogue refueling system. In such examples, the method may include removing the refueling apparatus. In some examples, the aircraft may not be a tanker aircraft, but may be constructed according to an aircraft design including provisions for installation of a refueling system, such as a pressure box. In some examples, the aircraft may be a tanker aircraft including a pressure box, which has previously undergone retrofitting in which a refueling system was removed.

The method may further include installing an APU in the internal compartment. The engine, compressor, and generator of the APU may be positioned in a main portion of the internal compartment, previously configured to house a reel of an HDU. The APU may be mounted with typical APU mounts. For instance, the engine of the APU may be suspended from a ceiling or top wall of the internal compartment, or may be supported on an interior side of the skin of the fuselage.

An exhaust duct may be extended from the engine, through a tapered aft portion of the compartment, to an existing opening in the skin of the fuselage. The APU may thereby vent exhaust exterior to the aircraft. A fuel supply of the aircraft may be connected to the APU through an existing fuel pipe connection of the compartment. Similarly, other systems of the aircraft such as electrical, pneumatic, hydraulic, or cooling systems may be connected to the APU through existing dedicated connections of the compartment and/or existing general-purpose access points of the compartment. Such connections may be established without disrupting a pressure seal of the compartment relative to the remaining interior of the fuselage. Such connections may be established without constructing additional access points.

The method may further include installing an air intake structure for the APU. The air intake structure may include an inlet in fluid communication with the exterior of the aircraft and may be positioned forward of the exhaust duct. The air intake structure may be positioned entirely inside the internal compartment or may extend partially outside the compartment and the fuselage. The air intake structure may be installed into and/or in place of an existing external access door of the internal compartment.

EXAMPLES, COMPONENTS, AND ALTERNATIVES

The following sections describe selected aspects of exemplary aircraft as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Aircraft with Auxiliary Power Unit

As shown in FIGS. 1-5, this section describes an illustrative aircraft 100. Aircraft 100 is an example of a retrofitted tanker aircraft, as described above. As shown in FIG. 1, the aircraft includes a fuselage 110 with a wing section 112 and a tail section 114. A pair of wings 116 are affixed to the wing section, and both horizontal and vertical stabilizers 118 are affixed to the tail section. Depending on the intended function or operational environment of the aircraft, designs may vary. For example, the aircraft may be tail-less, and may not include stabilizers.

The terms "inboard," "outboard," "forward," and "aft" (and the like) as used below, are intended to be understood in the context of aircraft 100. For example, "forward" means toward the front or nose portion of the aircraft, and "aft" means toward the rear or tail section of the aircraft. In the absence of the aircraft, the same directional terms may be used as if the aircraft were present.

Fuselage 110 of aircraft 100 includes a skin 120 and an interior volume 122. During flight, the interior volume is pressurized to provide a safe environment for passengers, crew, and equipment. Typically, fuselage 110 may be designed to withstand a pressure differential of up to approximately 10 pounds per square inch (PSI). Military aircraft and/or aircraft designed for high-altitude flight may be rated for greater pressure differentials.

In the present example, aircraft 100 is a tanker aircraft manufactured with a refueling system for probe and drogue refueling. The refueling system includes a compartment 124 disposed in interior volume 122 of fuselage 110. Compartment 124 is located on a centerline 126 of fuselage 110, between wing section 112 and tail section 114. The compartment is disposed at an underside or bottom of fuselage 110, adjacent skin 120. The location of compartment 124 may vary between tanker aircraft, according to the design and placement of the refueling system and other systems.

Figure 2:
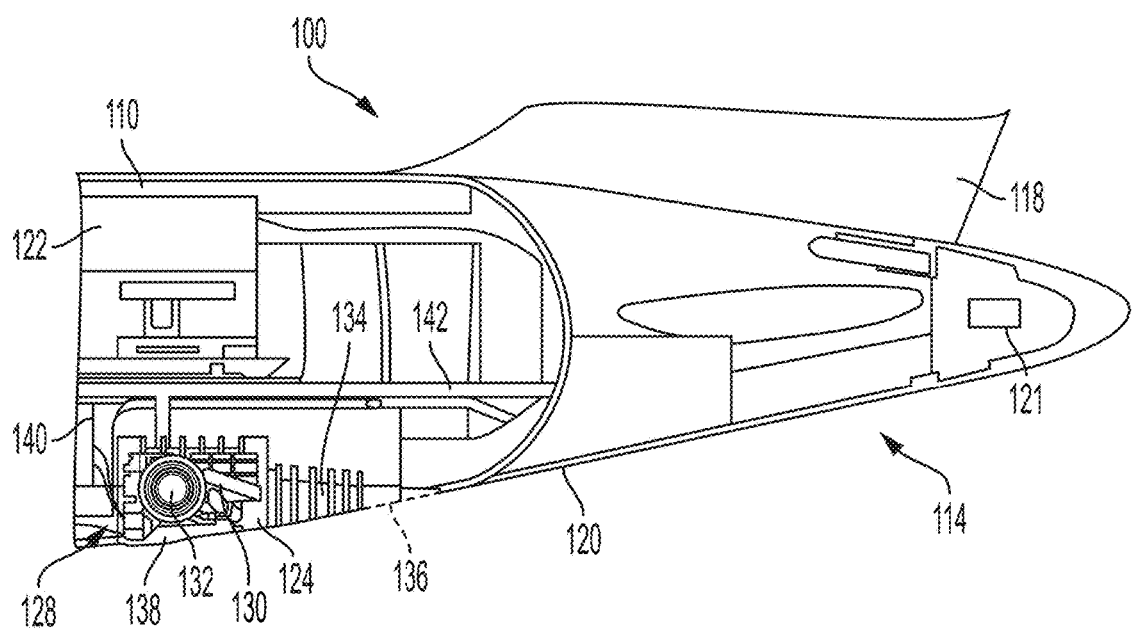
FIG. 2 is a cross-sectional view of a portion of the tanker aircraft of FIG. 1, prior to retrofitting.

FIG. 2 depicts a cross-section of aircraft 100 prior to retrofit. A hose drum unit (HDU) 128, including a hose 130 and a reel 132, is mounted in compartment 124. Compartment 124 is sealed off from interior volume 122 of fuselage 110 and remains at atmospheric pressure even when the interior volume is pressurized. That is, the compartment maintains substantially the same pressure as the pressure external to the aircraft. Hose 130 thereby experiences a uniform pressure when extended for refueling, from HDU 128 to the probe of an aircraft undergoing refueling.

Compartment 124 includes a hose trough 134, extending aft to an aperture 136 in skin 120 of the fuselage. When extended, hose 130 uncoils from reel 132, extending along hose trough 134 and out of aperture 136. The hose, and attached drogue, can be thereby trailed below and aft of compartment 124 as appropriate for centerline refueling.

Compartment 124 also includes an access door 138, in skin 120. The access door is located forward of aperture 136, proximate hose reel 132. Access door 138 may be sealed and/or locked during flight and may not be utilized in refueling operations. Instead, access door 138 may be used by service personnel performing maintenance and/or repairs of the refueling system of aircraft 100. For example, access door 138 may be opened to allow service access to HDU 128.

Compartment 124 is configured to allow connection of HDU 128 to other systems of aircraft 100, without breaking the pressure seal between the compartment and interior volume 122 of fuselage 110. For example, the depicted HDU is connected to an electrical system 140 and a fuel system 142 of aircraft 100. The systems connected may vary according to the HDU installed and the design of the aircraft. For example, the compartment may be further configured for pneumatic and/or hydraulic connections.

Figure 3:
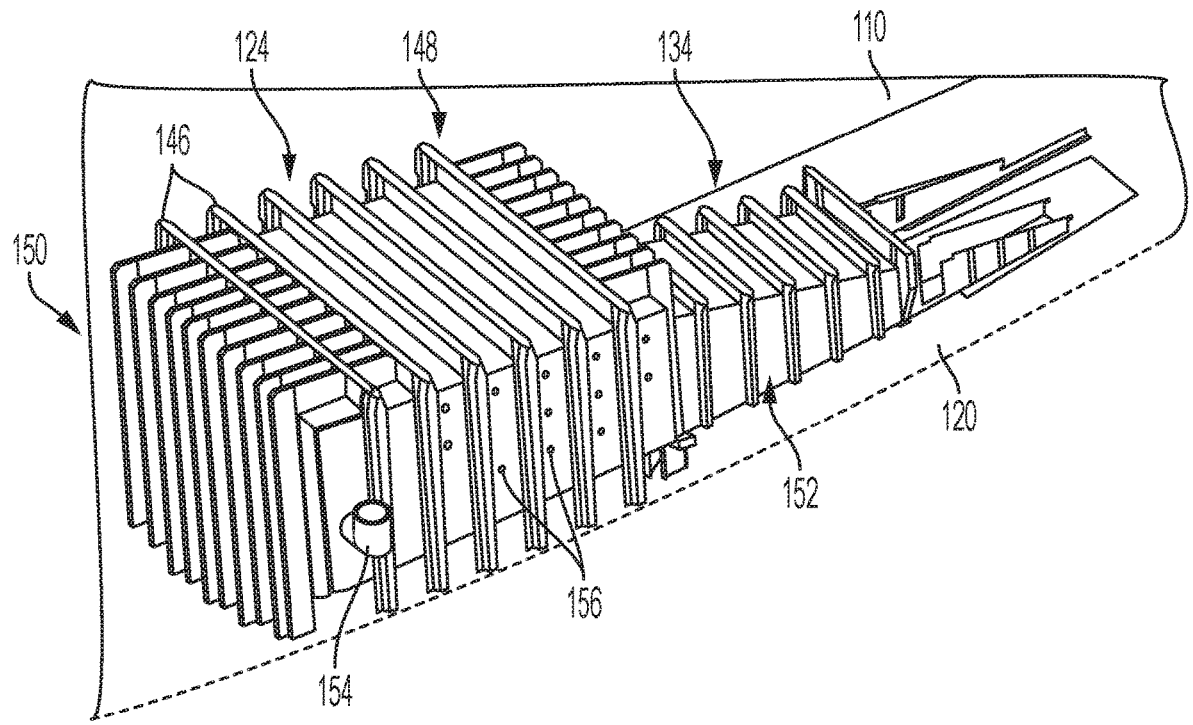
FIG. 3 is an isometric view of the hose drum unit compartment of the tanker aircraft of FIG. 1.

FIG. 3 is an isometric view of an exterior of compartment 124. As shown more clearly in this drawing, the compartment is defined between multiple reinforced walls 144 and in interior surface of skin 120 of fuselage 110. Walls 144 are generally planar, but include reinforcing ribs 146 configured to improve structural strength needed to withstand expected pressure differentials between interior volume 122 and compartment 124. Ribs 146 extend both fore and aft, parallel to the centerline of the aircraft, and left and right, perpendicular to the centerline.

Walls 144 form a main body portion 148 defining a fore-chamber 150 configured to house hose reel 132, and a tapered portion 152 defining hose trough 134. Hose trough 134 may also be referred to as an aft-chamber. Main body portion 148 and fore-chamber 150 are generally rectangular in cross-section, as allowed by the contour of skin 120. Main body portion 148 is larger than tapered portion 152 and disposed forward of the tapered portion. Tapered portion 152 and hose trough 134 are also generally rectangular in cross-section, with decreasing dimensions as the tapered portion extends aft from main body portion 148.

Walls 144 of main body portion 148 also include connection ports, access points, valves, and/or connectors configured for connection of the HDU to systems of aircraft 100. As shown in FIG. 3, the depicted example includes a fuel inlet pipe 154 and a plurality of access points 156. The HDU can be connected to the fuel system of the aircraft by fuel inlet pipe 154. For instance, the HDU may be connected to fuel tanks which supply the engines of the aircraft and/or to fuel tanks dedicated to refueling. The pump, sensor, controls, and/or other systems that interface with the HDU can be powered by the aircraft electrical system by connection through one or more access points 156. For instance, the HDU may draw power from a tail-mounted auxiliary power unit (APU) 121 (see FIG. 2) and/or power generated by the engines of the aircraft.

Depending on the specific aircraft or HDU, and/or other design considerations, compartment 124 may vary in size, shape, and/or connectivity. For example, the compartment may comprise a single chamber, may be round in cross-section, and/or may not include an access door. Preferably, hose aperture 136 (see FIG. 2) is located at an aft end of the compartment. Variations from a conventional HDU pressure compartment design may necessitate additional retrofitting work, but not preclude use of the compartment to house an APU.

Figure 4:
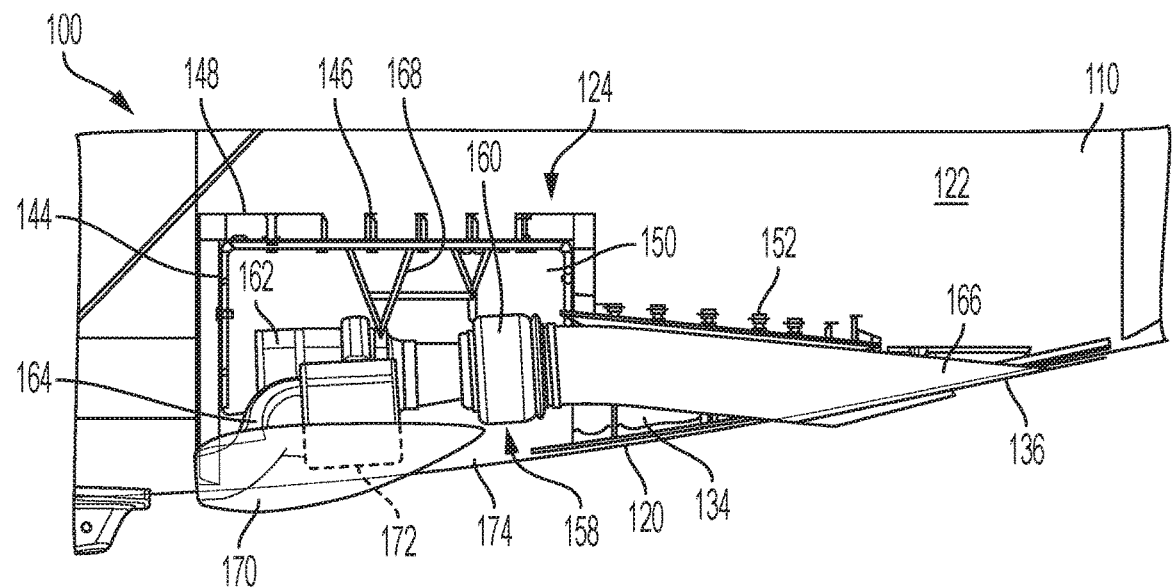
FIG. 4 is a cross-sectional view of a portion of the tanker aircraft of FIG. 1, subsequent to retrofitting.
Figure 5:
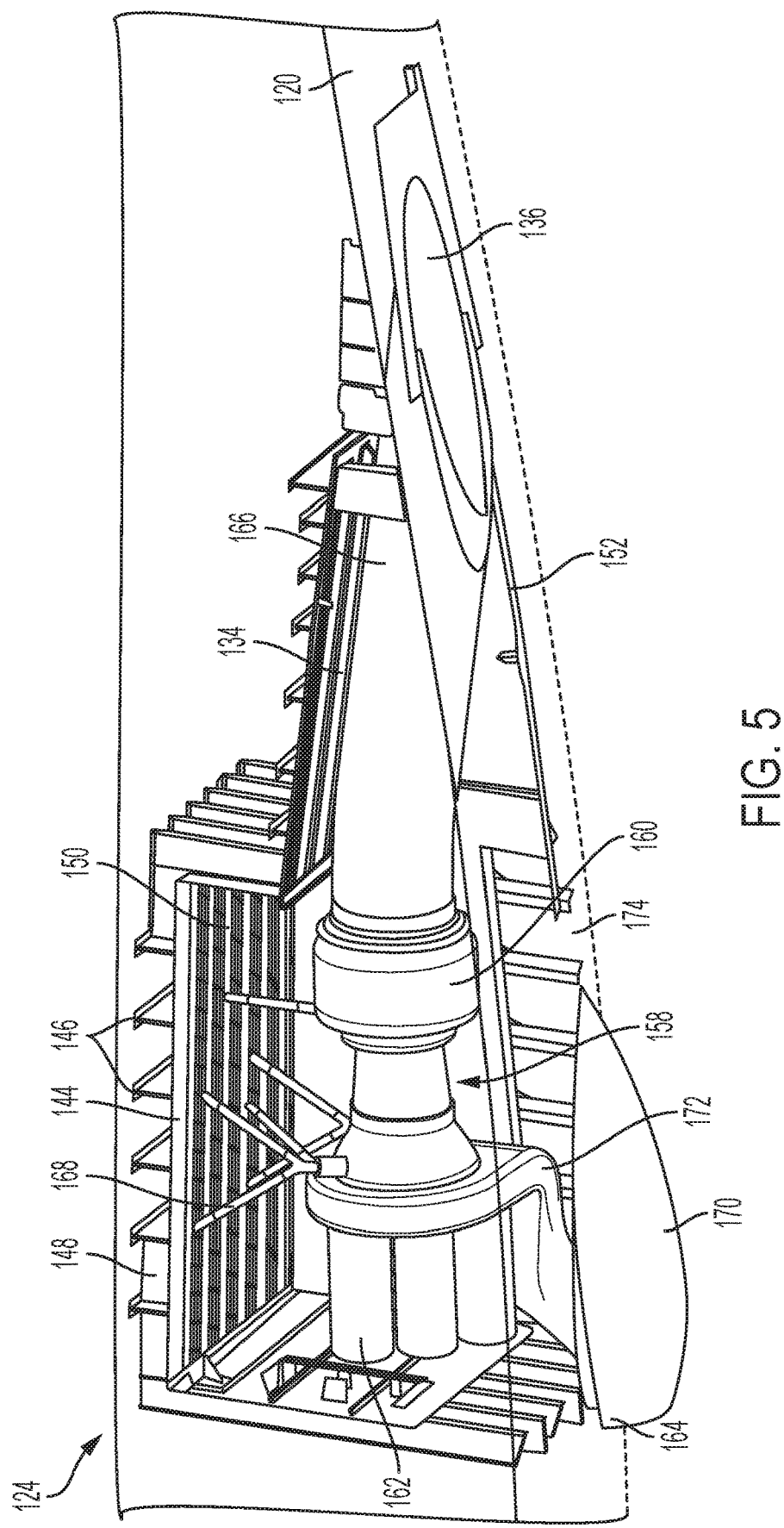
FIG. 5 is an isometric cut-away view of the retrofitted compartment and auxiliary power unit of FIG. 4.

FIGS. 4-5 depict compartment 124 subsequent to retrofit, FIG. 4 showing a cross-section of the compartment and FIG. 5 showing the compartment with a left-hand reinforced wall cut away. The HDU, including the hose, reel, related electronics, and other systems, have been removed. An auxiliary power unit (APU) 158 is mounted in compartment 124. APU 158 includes an engine 160 and a generator assembly 162. The generator assembly may include a generator and appropriate gearbox to transfer power from the engine. The APU further includes an air intake structure 164 and an exhaust duct 166.

Compartment 124 may be suited to house APU 158 for multiple reasons. For example, turbine engines typically used in APUs may be designed for operation at atmospheric pressures external to the aircraft, as maintained by the compartment. For example, HDUs and APUs may be sufficiently comparable in size as to allow installation of a standard-sized APU, for instance a Cobham FR480 Hose Drum Unit measures approximately 4 feet by 2.5 feet while a Honeywell T55 turboshaft engine measures approximately 4 feet by 2 feet. For example, mounting the APU interior to the fuselage may limit the impact of the installation on overall aircraft aerodynamics. For example, the geometry of the compartment may allow the APU to be installed in an orientation with the air intake forward of the exhaust duct. For example, the APU may occupy valuable space otherwise which may potentially remain unused after removal of the refueling system.

APU 158 may be any desired APU of appropriate size. For example, the APU may be a standard model typically used for tail-mounting, or may be a model specifically designed for retrofit mounting as described herein. APU 158 may include a compressor configured to supply pneumatic power to aircraft 100, or may be configured to deliver only electricity. The APU may be fueled with aviation fuel such as aviation turbine fuel (ATF), may include a fuel cell such as a solid oxide fuel cell (SOFC), and/or may be powered in any effective manner. Standard model aviation fuel powered APUs may offer a simplest and lowest-cost option, without requiring additional design and/or testing work.

Engine 160 and generator assembly 162 are disposed in fore-chamber 150. In the depicted example, the engine is supported by mounting hardware or mounts 168 from an upper or ceiling wall of reinforced walls 144 of main body portion 148. Mounts 168 may include standard APU mounting hardware modified and/or adjusted for use in compartment 124. Engine 160 and generator assembly 162 may be supported in any effective manner, but adaptation of standard APU mounts may simplify installation and reduce costs.

Intake structure 164 includes an inlet 170 disposed exterior to compartment 124, and an intake plenum 172 disposed in fore-chamber 150 and connected to engine 160. Air from the exterior of aircraft 100 may be collected by inlet 170 and delivered through plenum 172 to the engine. Inlet 170 and intake structure 164 may be sized and/or configured according to the intake requirements of APU 158.

In the present example, intake structure 164 further includes a panel 174 configured to replace the access door of compartment 124. Inlet 170 is mounted to panel 174, and the intake structure extends from the inlet, through the panel, to plenum 172. In some examples, the access door may be left in place and modified to support the intake structure. Any effective intake structure may be used to provide air to engine 160, and the intake structure may be mounted in any effective manner. Preferably, an inlet with known aerodynamic properties may be used, to simplify design.

Panel 174 and/or the access door may be further modified to allow fluid communication between compartment 124 and the exterior of the aircraft. Such communication may allow pressure to equalize between the compartment and the exterior, allowing the compartment to maintain a pressure equal to the external pressure. Prior to retrofit, such equalization may be accomplished via aperture 136, but subsequent to retrofit the aperture may be sealed as detailed below. In some examples, pressure may be equalized by intake structure 164 and/or by any effective structure.

Exhaust duct 166 is coupled to engine 160 and extends from the engine to hose aperture 136, through hose trough 134. Exhaust generated by engine 160 may be vented through duct 166 to the exterior of aircraft 100. Due to the relative locations of the access door and hose aperture of compartment 124, exhaust duct 166 may vent exhaust aft of inlet 170, thereby preventing undesirable intake of exhaust by APU 158.

Duct 166 may be sized and/or configured according to specifications of APU 158. The duct may include structures and/or features such as a seal at aperture 136 to prevent admittance of exhaust to compartment 124 and/or a heat protector to prevent heat transfer from the exhaust to skin 120 of the fuselage.

APU 158 is also connected to other systems of aircraft 100. Referring back to FIG. 3, the APU is connected to the fuel system of the aircraft through fuel pipe 154. Aviation fuel may be supplied from fuel tanks of aircraft 100 to the engine of the APU. The APU is connected to the electrical system of the aircraft through one or more access points 156. Instead of receiving power through an access point, the APU may supply power. In some examples, the APU may also receive power from the electrical system of the aircraft, for instance a starter of the APU engine may be powered by the electrical system.

Examples of additional connections include, but are not limited to, supply of pneumatic power from the APU to the aircraft, supply of coolant or cooling air from the aircraft to the APU, supply of bleed air to the APU, and operational connection such as exchange of information between data systems of the APU and the aircraft. Connections required for the APU may be similar to those used for the HDU, simplifying installation and allowing access points to be used as originally configured. In some examples the fuel pipe and/or some or all of the access points may be used without alteration. Some access points may require alteration to allow connection of alternative systems and/or to allow operation in a reverse direction, i.e. a change from receipt to supply.

In some examples, retrofitting may require alterations to compartment 124 such as creation of additional access through reinforced walls 144. Ideally, depending on the specifics of compartment 124 and the selected APU, retrofitting may not require any modification to the primary structure of the aircraft.

B. Illustrative Retrofitting Method

Figure 6:
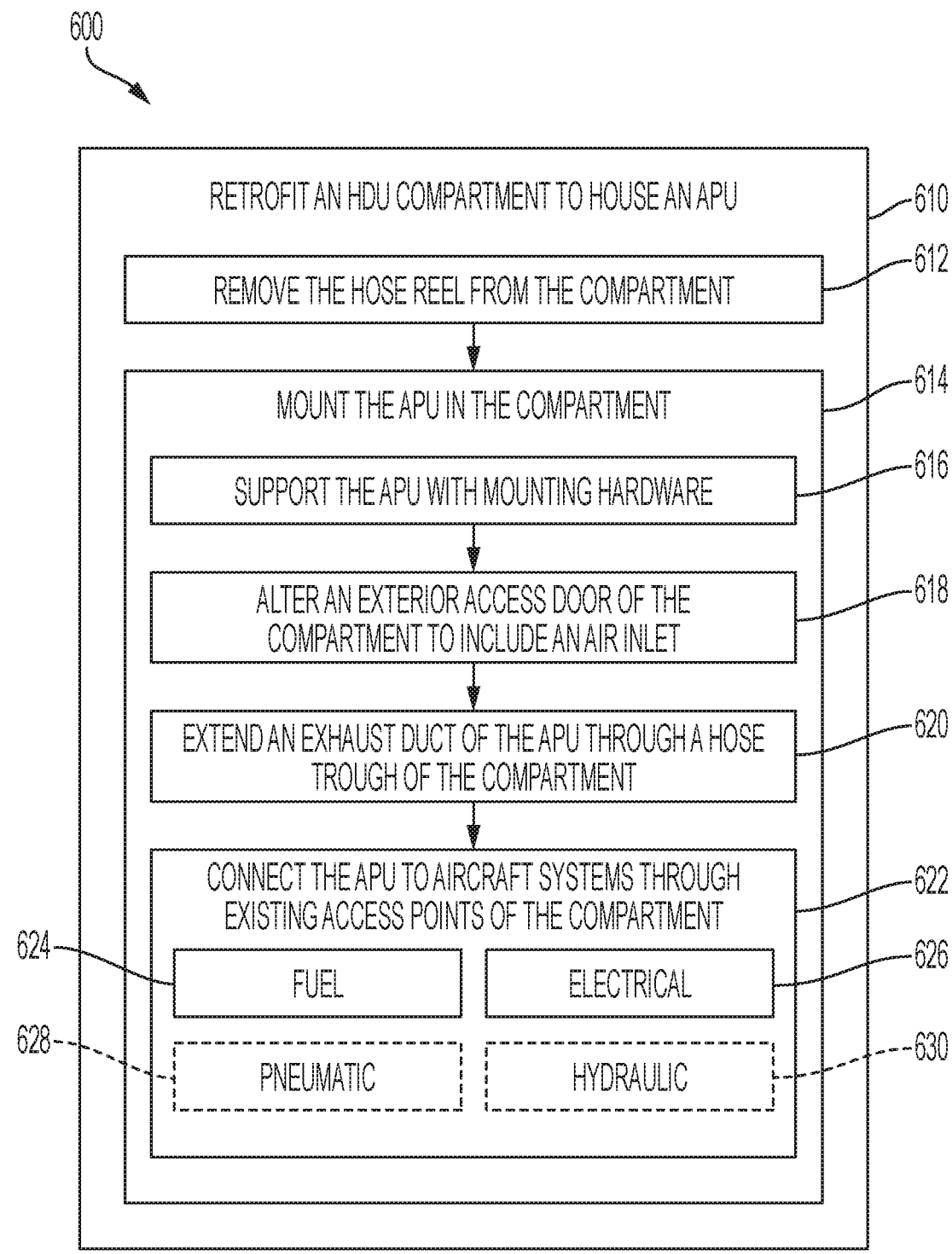
FIG. 6 is a flow chart depicting steps of an illustrative method for retrofitting a tanker aircraft with an auxiliary power unit according to the present teachings

This section describes steps of an illustrative method 600 for installing an Auxiliary Power Unit (APU) in an aircraft; see FIG. 6. Aspects of aircraft, pressure compartments, and/or APUs described above may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 600 are described below and depicted in FIG. 6, the steps need not necessarily all be performed, and in some cases may be performed simultaneously or in a different order than the order shown.

At step 610, the method includes retrofitting a hose drum unit (HDU) compartment to house an APU. The compartment may be part of a refueling system of an aircraft, such as a tanker aircraft, and may also be referred to as a pressure box and/or pressure compartment. The compartment may be disposed in a fuselage of the aircraft but sealed off from the fuselage. The compartment may be in fluid communication with the exterior of the aircraft and may maintain an air pressure substantially equal to the exterior air pressure. The compartment may be configured to withstand expected pressure differentials between the pressurized interior of the fuselage and the exterior air pressure when the aircraft is in flight.

Step 610 may be performed as part of an overall remodel or redesign of an aircraft. For example, step 610 may be included when a tanker aircraft is repurposed for use as a cargo plane and/or for implementation of new avionics equipment. Typically, such redesign of the aircraft will include upgrades to equipment and/or installation of new equipment, increasing load on the power generating capabilities of the aircraft. Additionally, once the refueling system is removed in such a redesign, the HDU compartment may no longer serve a functional purpose. Step 610 may both re-purpose the HDU compartment and supply additional power, with minimal or no structural alterations to the aircraft.

Sub-step 612 of step 610 includes removing the hose reel from the compartment. The hose reel, HDU, and related systems and/or equipment may be reused and/or disposed of. Any and/or all components of the refueling system may be removed from the compartment and/or from other sections of the aircraft. For example, the sub-step may include removing a motor, hose, and sensors from the compartment and removing a control system and fuel tanks from elsewhere in the aircraft.

In some examples, sub-step 612 may be omitted when the refueling system has previously been removed. For instance, the sub-step may be omitted when a tanker aircraft previously redesigned for use as a cargo plane is further modified for implementation of new avionics equipment, necessitating additional electrical power. In some examples, sub-step 612 may include removing equipment unrelated to a refueling system from the compartment. In some examples, an aircraft may include a compartment appropriate for use with an HDU and/or refueling system, but a refueling system may never have been installed. Sub-step 612 may also be omitted in such examples.

Sub-step 614 of step 610 includes mounting an APU in the compartment. Similarly to APU 158 discussed above, the APU may be any desired APU of appropriate size, but standard model aviation fuel powered APUs may offer a simplest and lowest-cost option. An engine and generator of the APU may be located in a main chamber of the compartment. The APU may be selected according to a volume or size of the main chamber, such that the engine, generator, and any related systems or components can be appropriately mounted in the chamber.

Sub-step 616 of sub-step 614 includes supporting the APU with mounting hardware. The engine and generator of the APU may be mounted similarly to typical mounting methods, with standard mounting hardware. For example, the engine may be suspended from an upper wall or ceiling of the main chamber, with standard APU mount hardware. In some examples, alternative or custom mounting methods and/or hardware may be used.

Sub-step 618 of sub-step 614 includes altering an exterior access door of the compartment to include an air inlet. The exterior access door may be disposed in the exterior skin of the aircraft, and prior to retrofit may be configured to allow access to the refueling system from outside the aircraft. The sub-step may include mounting the air inlet to an exterior of the access door, and creating and/or adapting an aperture in the access door to allow connection of the air inlet to the APU in the compartment.

In some examples, sub-step 618 may include replacing the access door with a panel or other structure configured to facilitate air intake. In some examples, the sub-step may include permanently fixing the access door in a closed position. Sub-step 618 may be performed according to the specific structure of the access door and the selected air inlet.

Sub-step 620 of sub-step 614 includes extending an exhaust duct of the APU through a hose trough of the compartment. The hose trough may extend aft from the main chamber of the compartment, to an aperture in the exterior skin of the aircraft. Prior to retrofit, the hose of the refueling system may be extended along the hose trough and out the aperture to the exterior of the aircraft during refueling operations. The sub-step may include permanently connecting the exhaust duct of the APU to the aperture, such that exhaust generated by the APU is vented out of the aperture.

Sub-step 622 of sub-step 614 includes connecting the APU to aircraft systems through existing access points of the compartment. The existing access points may include connection ports, valves, and/or connectors, which prior to retrofit may be configured to connect the HDU to aircraft systems. For example, the access points may include a fuel inlet pipe, one or more electrical connectors, pneumatic or hydraulic fittings, coolant pipes, and/or data system connectors. Connection of the APU to the aircraft systems may be similar to standard installation methods for APUs such as tail-mounted APUs, but may be accomplished through the access points of the compartment.

Sub-step 624 of sub-step 622 includes connecting the APU to a fuel system of the aircraft. The APU may be connected through a fuel inlet pipe of the compartment. Prior to retrofit the fuel inlet pipe may be configured to supply fuel to the HDU for refueling operations, and may therefore not require alteration to supply fuel to the APU.

Sub-step 626 of sub-step 622 includes connecting the APU to an electrical system of the aircraft. The APU may be connected through one or more electrical connectors of the compartment such as plugs and/or adaptors. Prior to retrofit the electrical connectors may be configured to supply power to the HDU. The APU may instead supply power to the aircraft electrical system. In some examples, the APU may also receive power, for instance a starter of the APU may be powered by the aircraft electrical system.

Optional sub-step 628 of sub-step 622 includes connecting the APU to a pneumatic system of the aircraft. Depending on the installed HDU, the compartment may or may not include access points configured for pneumatic connection. For APUs requiring pneumatic connection, an existing pneumatic fitting may be used or an access point originally configured for another connection type may be adapted for a pneumatic fitting.

Optional sub-step 630 of sub-step 622 includes connecting the APU to a hydraulic system of the aircraft. Similarly to optional sub-step 628, sub-step 630 may be performed according to the specifics of the previously installed HDU and the selected APU.

In some examples, the selected APU may require connections for which the compartment was not originally configured. In such examples, existing access points may be adapted and/or additional access points may be added. Preferably method 600 may be performed without structural alterations to the compartment, the exterior skin of, and/or other aircraft structures. However, the method may include minimal structural changes and/or additions as necessitated by the specific design of the aircraft, refueling system, and selected APU.

C. Illustrative Aircraft and Associated Method

Figure 7:
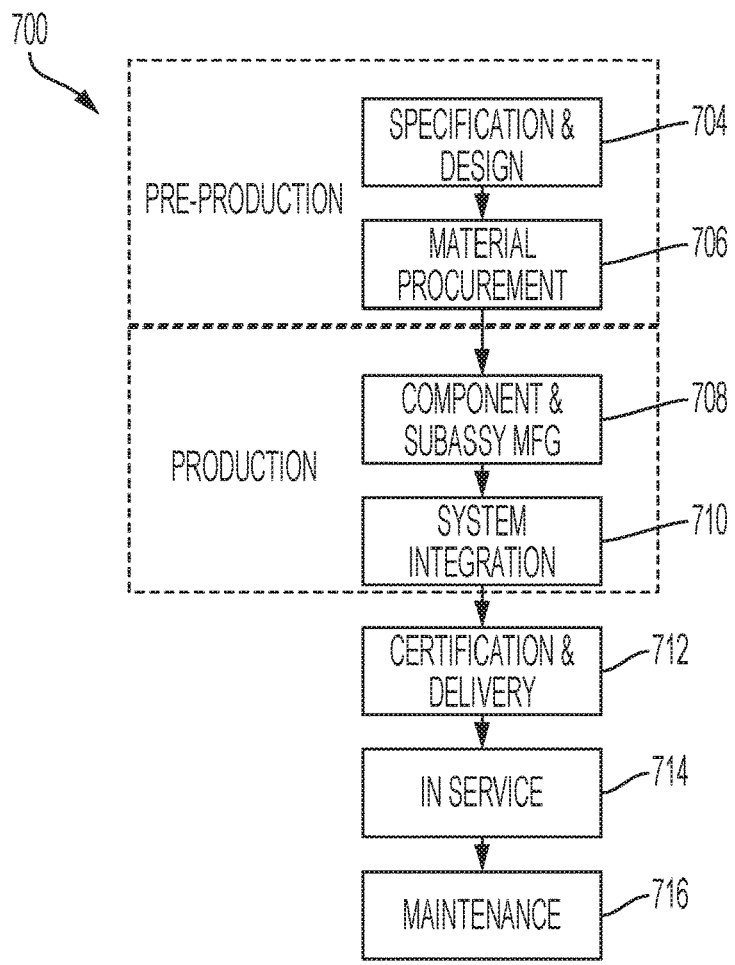
FIG. 7 is a flowchart depicting steps of an illustrative aircraft manufacturing and service method.
Figure 8:
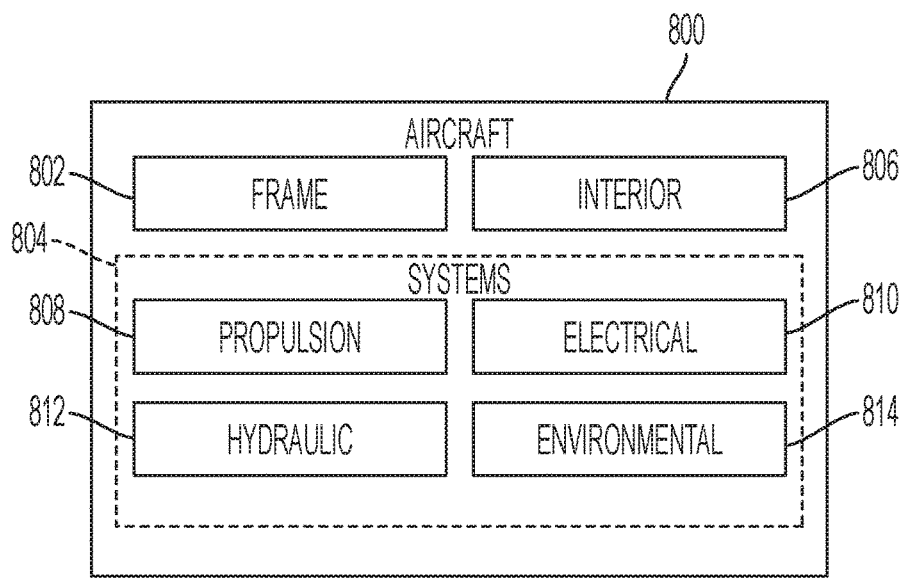
FIG. 8 is a schematic diagram of an illustrative aircraft.

Examples disclosed herein may be described in the context of an illustrative aircraft manufacturing and service method 700 (see FIG. 7) and an illustrative aircraft 800 (see FIG. 8). Method 700 includes a plurality of processes, stages, or phases. During pre-production, method 700 may include a specification and design phase 704 of aircraft 800 and a material procurement phase 706. During production, a component and subassembly manufacturing phase 708 and a system integration phase 710 of aircraft 800 may take place. Thereafter, aircraft 800 may go through a certification and delivery phase 712 to be placed into in-service phase 714. While in service (e.g., by an operator), aircraft 800 may be scheduled for routine maintenance and service 716 (which may also include modification, reconfiguration, refurbishment, and so on of one or more systems of aircraft 800). While the examples described herein relate generally to operational use during in-service phase 714 of aircraft 800, they may be practiced at other stages of method 700.

Each of the processes of method 700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 800 produced by illustrative method 700 may include a frame 802 with a plurality of systems 804 and an interior 806. Examples of plurality of systems 804 include one or more of a propulsion system 808, an electrical system 810, a hydraulic system 812, and a fuel system 814. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 800, the principles disclosed herein may apply to other vehicles, e.g., land vehicles, marine vehicles, etc.

Apparatuses and methods shown or described herein may be employed during any one or more of the stages of the manufacturing and service method 700. For example, components or subassemblies corresponding to component and subassembly manufacturing phase 708 may be fabricated or manufactured in a manner similar to components or subassemblies produced while aircraft 800 is operating during in-service phase 714. Also, one or more examples of the apparatuses, methods, or combinations thereof may be utilized during production stages of phase 708 and phase 710, for example, by substantially expediting assembly of or reducing the cost of aircraft 800. Similarly, one or more examples of the apparatus or method realizations, or a combination thereof, may be utilized, for example and without limitation, while aircraft 800 is in service phase 714 and/or during maintenance and service phase 716.

ILLUSTRATIVE COMBINATIONS AND ADDITIONAL EXAMPLES

This section describes additional aspects and features of aircraft with auxiliary power units and methods of installation, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An aircraft, comprising:
a fuselage including a compartment configured to house refueling apparatus, and
an Auxiliary Power Unit (APU) mounted in the compartment.

A1. The aircraft of A0, wherein the compartment maintains an air pressure substantially equal to the air pressure external to the fuselage.

A2. The aircraft of A0 or A1, wherein the compartment is configured to house a refueling hose drum unit.

A3. The aircraft of any of A0-A2, wherein the APU is retrofitted into the compartment after removal of a refueling apparatus.

A4. The aircraft of any of A0-A, wherein the compartment has an inlet cover.

A5. The aircraft of any of A0-A4, wherein the fuselage has a wing section and a tail section, the compartment being located between the wing section and the tail section.

A6. The aircraft of any of A0-A5, wherein the fuselage has a centerline and the compartment is disposed on the centerline.

A7. The aircraft of any of A0-A6, wherein the fuselage has an exterior skin and the compartment is disposed adjacent an underside portion of the exterior skin.

A8. The aircraft of any of A0-A7, wherein the compartment has a fore-chamber connected to an aft-chamber, the fore-chamber being larger than the aft-chamber.

A9. The aircraft of A8, wherein the APU has an exhaust channel contained in the aft-chamber.

A10. The aircraft of A8 or A9, wherein the APU has a generator, a gearbox, and a compressor contained in the fore-chamber.

A11. The aircraft of any of A8-A10, wherein the fore-chamber has an opening, the APU having an air inlet descending through the opening of the fore-chamber.

B0. A method of installing an Auxiliary Power Unit (APU) in an aircraft, comprising:
retrofitting a refueling Hose Drum Unit (HDU) compartment in a fuselage to house an APU.

B1. The method of B0, wherein the aircraft includes a refueling hose reel housed in the HDU compartment.

B2. The method of B1, wherein the retrofitting step includes removing the refueling hose reel from the HDU compartment.

B3. The method of any of B0-B2, wherein the retrofitting step includes mounting an APU in the HDU compartment.

B4. The method of B3, wherein the mounting step includes extending an exhaust duct of the APU through a hose trough of the HDU compartment.

B5. The method of B3 or B4, wherein the mounting step includes altering an exterior access door of the HDU compartment to include an air inlet.

B6. The method of any of B3-B5, wherein the mounting step includes connecting a fuel supply of the aircraft to an engine of the APU through a fuel pipe of the HDU compartment.

B7. The method of any of B3-B6, wherein the mounting step includes suspending the APU from an upper wall of the HDU compartment with one or more APU mounts.

B8. The method of any of B3-B7, wherein the mounting step includes electrically connecting the APU to an electrical system of the aircraft through an existing electrical connection point of the HDU compartment.

B9. The method of any of B3-B8, wherein the mounting step includes pneumatically or hydraulically connecting the APU to a pneumatic or hydraulic system of the aircraft through an existing access point of the HDU compartment.

C0. An aircraft, comprising:
a fuselage including an internal compartment that maintains substantially the same pressure as the pressure external to the aircraft, and
an APU mounted in the compartment.

C1. The aircraft of C0, wherein the internal compartment is configured to house a refueling hose and drogue reel.

C2. The aircraft of C0 or C1, wherein the internal compartment has a diminished cross-section from a front end to an aft end of the compartment.

C3. The aircraft of any of C0-C2, wherein the internal compartment is disposed adjacent an underside of the fuselage.

C4. The aircraft of any of C0-C3, wherein the internal compartment is defined between a plurality of reinforced wall sections and a skin of the fuselage.

C5. The aircraft of C4, wherein the plurality of reinforced wall sections form a main body portion and a tapered portion, the tapered portion extending aft from the main body portion.

C6. The aircraft of C5, wherein the main body portion has a generally rectangular cross-sectional shape.

C7. The aircraft of C5 or C6, wherein an engine of the APU is mounted in the main body portion and an exhaust duct of the APU is mounted in the tapered portion.

C8. The aircraft of any of C0-C7, wherein the internal compartment includes a fuel inlet pipe.

C9. The aircraft of any of C0-C8, wherein the internal compartment includes an aperture through a skin of the fuselage to an exterior of the aircraft.

C10. The aircraft of any of C0-C9, wherein the internal compartment is sealed off from the rest of the fuselage except for a plurality of designated access ports.

C11. The aircraft of C10, wherein the plurality of designated access ports are configured for one or more of (a) an electrical connection, (b) a hydraulic connection (c) a pneumatic connection, or (d) a fuel supply.

C12. The aircraft of any of C0-C11, wherein the fuselage has a tail section and the internal compartment is disposed forward of the tail section.

Advantages, Features, and Benefits

The different examples of the Auxiliary Power Unit (APU) installation described herein provide several advantages over known solutions for installing additional APUs. For example, illustrative examples described herein allow existing structures in an aircraft to be used for installation of the APU.

Additionally, and among other benefits, illustrative examples described herein allow the APU to be safely housed in the interior of the fuselage of the aircraft.

Additionally, and among other benefits, illustrative examples described herein allow installation of the APU without creating additional openings in the skin of the fuselage.

Additionally, and among other benefits, illustrative examples described herein allow installation without design and construction of further access points for connections to aircraft systems such as electrical and fuel systems.

No known system or method can offer these advantages, particularly with such limited need for additional design work. Thus, the illustrative examples described herein are particularly useful for quick and simple retrofitting of aircraft. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An aircraft, comprising:
a fuselage including a pressurized internal volume and a refueling apparatus compartment,
a tail-mounted first Auxiliary Power Unit (APU), and a second APU mounted in the refueling apparatus compartment, wherein:
the refueling apparatus compartment is disposed in the pressurized internal volume and sealed off from the pressurized internal volume, the refueling apparatus compartment is disposed forward of the first APU, the refueling apparatus compartment includes:
a main body portion having multiple walls reinforced with reinforcing ribs to improve structural strength needed to withstand expected pressure differentials between the pressurized internal volume and the atmosphere, the multiple reinforced walls being distinct from an aircraft skin, and an aft tapered portion connected to the main body portion and generally forming a hose trough that extends aft to an aperture in a skin of an underside of the fuselage, the aperture being disposed forward of the first APU, and an exhaust duct of the second APU extends through the hose trough to the aperture.

2. The aircraft of claim 1, wherein the refueling apparatus compartment maintains an air pressure substantially equal to the air pressure external to the fuselage.

3. The aircraft of claim 1, wherein the refueling apparatus compartment has a hose reel chamber connected to the hose trough, the hose reel chamber being larger than the hose trough, the hose reel chamber and the hose trough each including a plurality of reinforced planar wall sections.

4. The aircraft of claim 1, wherein the APU is connected to a supply pipe of a probe and drogue refueling system of the aircraft.

5. The aircraft of claim 1, wherein:
the refueling apparatus compartment is defined between the multiple walls reinforced with reinforcing ribs and a skin of the fuselage.

6. An aircraft, comprising:
a pressurized fuselage,
an un-pressurized internal compartment disposed in the fuselage, and
an APU mounted in the compartment, wherein:
the internal compartment is defined between a plurality of reinforced planar wall sections and a skin of the fuselage, and the reinforced planar wall sections include a plurality of reinforcing ribs to improve structural strength needed to withstand expected pressure differentials between the pressurized fuselage and the atmosphere, the plurality of reinforced planar wall sections being distinct from the skin of the fuselage, and
the internal compartment includes a main body portion and an aft tapered portion.

7. The aircraft of claim 6, wherein the internal compartment is disposed at an underside of the fuselage.

8. The aircraft of claim 6, wherein the plurality of reinforced planar wall sections form the main body portion and the tapered portion, with the tapered portion extending aft from the main body portion.

9. The aircraft of claim 6, wherein the fuselage has a tail cone and the internal compartment is disposed forward of the tail cone.

10. The aircraft of claim 6, wherein the APU is suspended from an upper one of the plurality of reinforced planar wall sections of the internal compartment.

11. The aircraft of claim 6, wherein the plurality of reinforcing ribs include ribs extending perpendicular to the centerline of the aircraft, and ribs extending parallel to the centerline of the aircraft, at least one rib extending perpendicular to the skin of the fuselage.

12. The aircraft of claim 6, wherein the plurality of reinforced planar wall sections include an electrical access point to allow electrical connection of the APU to an electric grid of the aircraft, and to maintain the pressure of the compartment.

13. The aircraft of claim 6, wherein at least two of the plurality of reinforced planar wall sections are parallel a centerline of the aircraft, and are mutually perpendicular.

14. The aircraft of claim 6, wherein the main body portion is rectangular in cross-section as taken perpendicular to a centerline of the aircraft.

15. The aircraft of claim 14, wherein an engine of the APU is mounted in the main body portion and an exhaust duct of the APU is mounted in the tapered portion.

16. The aircraft of claim 6, wherein an exhaust duct of the APU is contained within the compartment.

17. An aircraft, comprising:
a fuselage having a skin and an underside,
a compartment in a pressurized internal volume of the fuselage, defined between a plurality of reinforced walls and the skin of the fuselage at the underside of the fuselage, the reinforced walls being reinforced with reinforcing ribs to maintain substantially the same pressure as the pressure external to the aircraft, the plurality of reinforced walls being distinct from the skin of the fuselage,
a first aperture through the underside of the fuselage, into the compartment,
a second aperture through the underside of the fuselage, into the compartment, the second aperture being aft of the first aperture, and
an APU mounted in the compartment, having an air intake extending through the first aperture and an exhaust extending to the second aperture,
wherein the first aperture and the second aperture are each forward of a tail cone of the aircraft.

18. The aircraft of claim 17, wherein the first aperture is through an external service access door, the air intake of the APU extending through the external service access door.

19. The aircraft of claim 18, wherein the air intake of the APU includes an inlet structure mounted to the access door, external to the fuselage.

20. The aircraft of claim 17, further including a tail-mounted APU.

* * * * *